United States Patent [19]

Sun

[11] Patent Number: 5,520,410
[45] Date of Patent: May 28, 1996

[54] DOOR LOCKING MECHANISM FOR AIR BAG MODULE

[75] Inventor: Xingyuan Sun, Rochester Hills, Mich.

[73] Assignee: TRW Vehicle Safety Systems Inc., Lyndhurst, Ohio

[21] Appl. No.: 381,762

[22] Filed: Feb. 1, 1995

[51] Int. Cl.[6] .................................................. B60R 21/20
[52] U.S. Cl. ........................ 280/728.3; 24/587; 403/381
[58] Field of Search ........................... 280/728.3, 728.2, 280/732, 731, 730.1, 728.1; 24/587, 576; 403/375, 381; 292/80, 91, DIG. 38

[56] References Cited

U.S. PATENT DOCUMENTS

| | | | |
|---|---|---|---|
| 3,416,199 | 12/1968 | Imamura | 24/587 |
| 3,640,546 | 2/1972 | Brawn | 280/732 |
| 5,062,663 | 11/1991 | Satoh | 280/728.3 |
| 5,066,037 | 11/1991 | Castrigno et al. | 280/728.3 |
| 5,354,094 | 10/1994 | Matano et al. | 280/728.3 |
| 5,403,034 | 4/1995 | Gans et al. | 280/728.3 |

FOREIGN PATENT DOCUMENTS

| | | | |
|---|---|---|---|
| 4139010 | 6/1992 | Germany | 280/728.3 |
| 5-4556 | 1/1993 | Japan | 280/728.2 |
| 2246983 | 2/1992 | United Kingdom | 280/728.3 |

Primary Examiner—Margaret A. Focarino
Assistant Examiner—Peter C. English
Attorney, Agent, or Firm—Tarolli, Sundheim, Covell, Tummino & Szabo

[57] ABSTRACT

A cover assembly (40) includes a deployment door (60) which covers a deployment opening (26) in an air bag module (10). A retainer assembly (70) connected with the deployment door (60) has an engaged condition blocking movement of the deployment door from a closed position to an open position. The retainer assembly (70) is moved to a disengaged condition when the deployment door (60) is opened by the inflating air bag (22). When it is in the disengaged condition, the retainer assembly (70) can not be returned to the engaged condition, and the deployment door (60) can not be returned to the closed position.

19 Claims, 3 Drawing Sheets

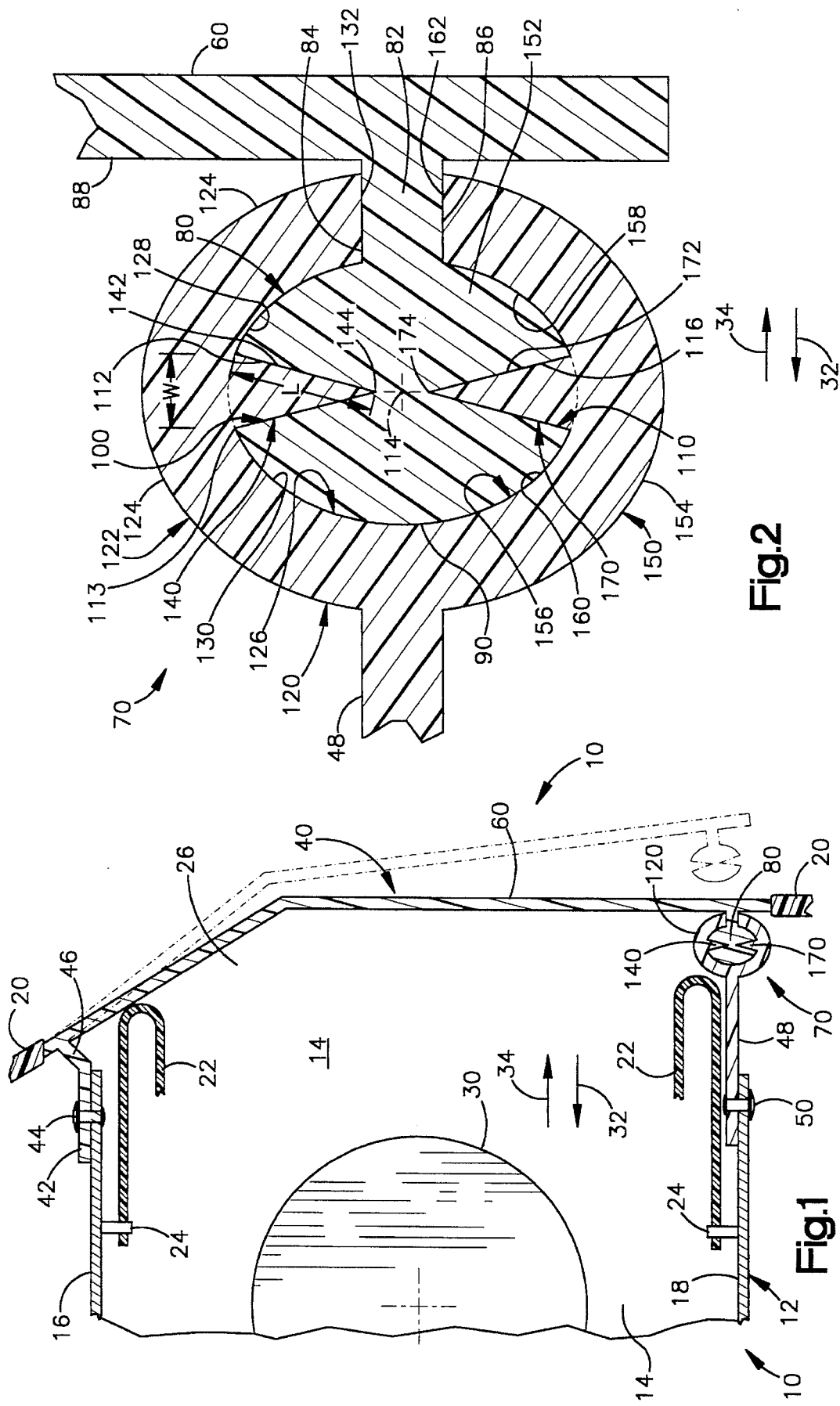

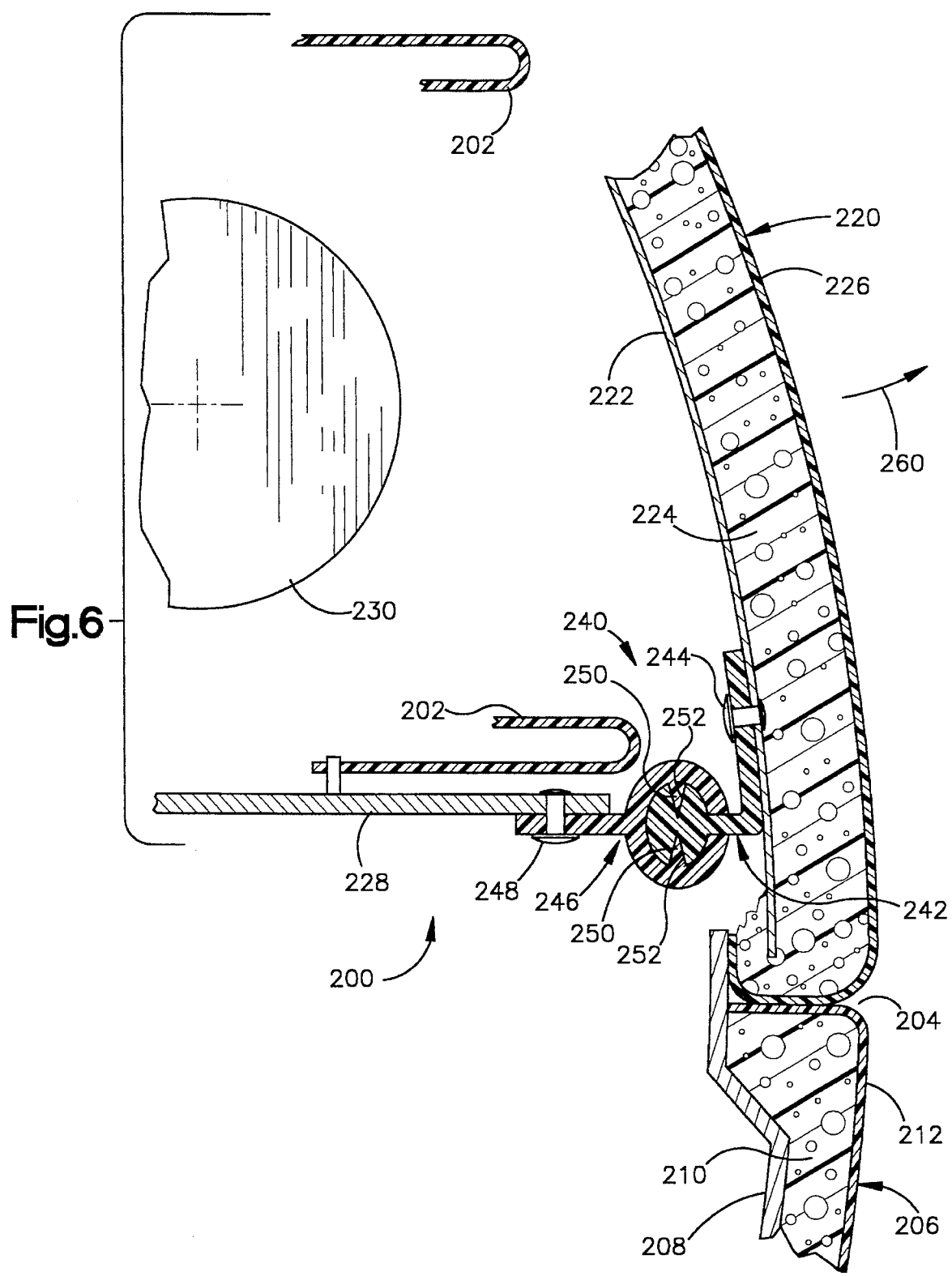

DOOR LOCKING MECHANISM FOR AIR BAG MODULE

BACKGROUND OF THE INVENTION

1. Technical Field

The present invention relates to a vehicle safety apparatus, and particularly relates to a locking mechanism for a door which covers an opening through which an inflatable vehicle occupant restraint deploys.

2. Description of the Prior Art

It is known to inflate an air bag to restrain a vehicle occupant in the event of a vehicle collision. The air bag, prior to inflation, is stored in a part of the vehicle, such as in the instrument panel, the steering wheel or door of the vehicle. When the air bag is inflated, it is deployed through an opening in the part of the vehicle in which it is stored. A deployment door or cover or the like closes the opening and conceals and protects the stored air bag. When the air bag is inflated, the inflating air bag pushes the deployment door or cover open to allow the air bag to inflate into a position to restrain the vehicle occupant. As used hereinafter in this application, the term "deployment door" means any cover for an opening through which an air bag is deployed.

A deployment door typically forms a part of an air bag module which includes an air bag and a source of fluid for inflating the air bag. The deployment door is presented or exposed to the passenger compartment of the vehicle. A deployment door is typically made of a flexible material so as to be resilient or energy absorbent in the event of contact by a vehicle occupant.

An air bag module typically includes means for resisting opening of the deployment door except upon inflation of the air bag. Some known deployment doors have releasable fasteners or clips or other locking portions which resist movement of the door to an open condition except upon inflation of the air bag. Once such doors have been opened, however, it is possible to return the doors to a closed condition.

It is desirable that a deployment door not be returnable to a closed condition after opening. If the door cannot be returned to a closed condition after opening, then it will be evident to a vehicle occupant that the air bag has been deployed and that the air bag module should be replaced or otherwise serviced. This feature can also minimize the possibility of unauthorized opening of an air bag module.

SUMMARY OF THE INVENTION

The present invention is a vehicle occupant safety apparatus comprising a housing having a deployment opening, an inflatable vehicle occupant restraint in the housing for, when inflated, restraining the vehicle occupant, and an inflator for, when actuated, inflating the inflatable vehicle occupant restraint through the deployment opening. A deployment door is movable between a closed position covering the deployment opening and an open position uncovering the deployment opening. Retainer means is movable between (a) an engaged condition blocking movement of the deployment door from the closed position to the open position and (b) a disengaged condition caused by movement of the deployment door from the closed position to the open position. The retainer means includes means for preventing movement of the retainer means from the disengaged condition to the engaged condition upon movement of the deployment door from the open position to the closed position. Thus, once opened, the door can not be closed The present invention is also a method of making a cover assembly for covering a deployment opening in a housing for an inflatable vehicle occupant restraint. The cover assembly includes first and second portions, one of which is movable between a closed position covering the deployment opening and an open position uncovering the deployment opening. The first and second portions of the cover assembly have respective first and second interlocking members which are relatively movable between an engaged condition blocking movement of the one portion of the cover assembly from the closed position to the open position and a disengaged condition allowing movement of the one portion of the cover assembly from the closed position to the open position. The method comprises the steps of: selecting a first moldable material for molding of the first interlocking member; molding the first interlocking member from the first material; selecting a second moldable material for molding of the second interlocking member which second material does not adhere to the first material when molded against the first material; and molding the second interlocking member in the engaged condition with the first interlocking member.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a schematic sectional view of an air bag module including a door assembly constructed in accordance with the present invention and shown in a closed condition;

FIG. 2 is an enlarged view of a portion of the door assembly of FIG. 1 shown in a closed condition;

FIG. 6 is an enlarged view of a portion of a door assembly which is constructed in accordance with a second embodiment of the present invention.

DESCRIPTION OF PREFERRED EMBODIMENT

Figure 3:
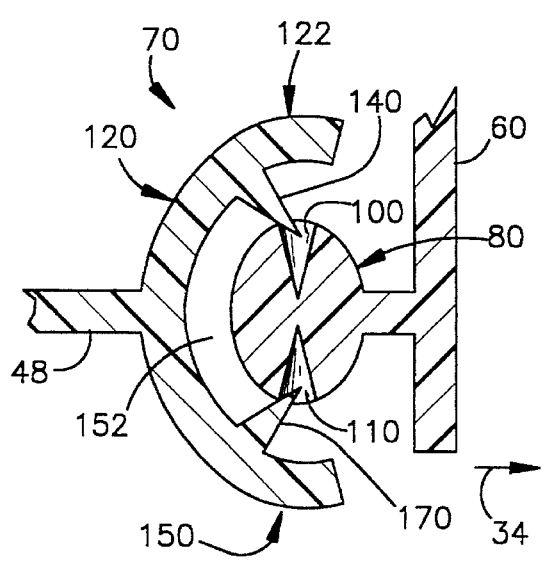
FIG. 3 is a view similar to FIG. 2 showing the door assembly in a partially opened condition.

The present invention relates to a vehicle safety apparatus for protecting an occupant of a vehicle in the event of a vehicle collision. The present invention is applicable to various vehicle safety apparatus constructions. As representative of the present invention, FIG. 1 illustrates a vehicle safety apparatus comprising an air bag module 10.

The air bag module 10 includes a metal reaction canister or housing 12 which defines a chamber 14. The housing 12 includes parallel upper and lower walls 16 and 18. The housing 12 is supported in a vehicle instrument panel 20 in a known manner (not shown).

An air bag 22, only portions of which are shown, is folded and stored in a known manner in the chamber 14 in the housing 12. Suitable fasteners indicated schematically at 24 secure the air bag 22 to the housing 12. The housing 12 defines a deployment opening 26 through which the air bag 22 is inflatable, as described below, to restrain a vehicle occupant.

An inflator 30 is disposed in the chamber 14 in the housing 12. The inflator 30 is supported by the housing 12 in a known manner (not shown). The inflator 30 may be any suitable air bag inflator such as a stored gas inflator, an inflator having combustible gas-generating material, or an inflator using both stored gas and a combustible gas-generating material. The inflator 30 is disposed in the chamber 14 generally forward of the air bag 22, that is, in a direction indicated by the arrow 32. The rearward direction in the vehicle is indicated by the arrow 34.

The air bag module 10 also includes a cover assembly 40 for covering the deployment opening 26. The cover assembly 40 includes an upper wall 42 which extends rearward from the upper wall 16 of the housing 12. A plurality of suitable fasteners such as the illustrated rivet 44 secure the upper wall 42 of the cover assembly 40 to the upper wall 16 of the housing 12. A hinge portion 46 of the cover assembly 40 extends rearward and upward from the upper wall 42 of the cover assembly.

A lower wall 48 of the cover assembly 40 extends rearward from the lower wall 18 of the housing 12. A plurality of suitable fasteners such as the illustrated rivet 50 secure the lower wall 48 of the cover assembly 40 to the lower wall 18 of the housing 12.

The cover assembly 40 includes a deployment door 60 which covers the deployment opening 26 in the housing 12 and conceals the air bag 22. The door 60 is molded as one piece with the hinge portion 46 and the upper wall 42 of the cover assembly 40. The door 60 extends downward from the hinge portion 46 of the cover assembly 40.

A retainer assembly 70 (FIGS. 1–5) connects the lower end (as viewed in FIG. 1) of the door 60 with the lower wall 48 of the cover assembly 40. The retainer assembly 70 includes an inner member or rod member 80 which is molded as one piece with the door 60. The rod member 80 and the door 60 are preferably made from Multi-Flex 1047 olefin which is available from Multibase Inc., of Copley, Ohio. This material is a flexible and resilient thermoplastic olefin having a melting point around 435° F. A connector portion 82 (FIG. 2) of the cover assembly 40 connects the rod member 80 with the door 60. The connector portion 82 has parallel upper and lower side surfaces 84 and 86 which extend transverse to an inner side surface 88 of the door 60.

Figure 4:
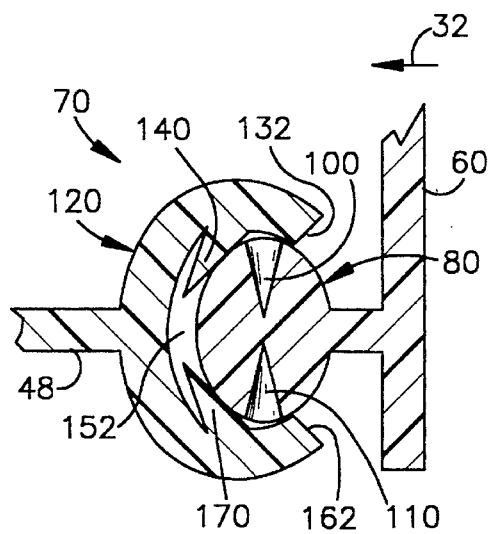
FIG. 4 is a view similar to FIG. 2 showing the door assembly during attempted closing.

The rod member 80 has a generally solid elliptical cross-sectional configuration as seen in FIGS. 2–4, and an ellipsoidal outer side surface 90. The rod member 80 could alternatively have a circular or other cross-sectional configuration.

A plurality of pairs of opposed recesses are formed in the rod member 80 during the process of molding the rod member. Each pair of opposed recesses includes an upper recess 100 and a lower recess 110. In the preferred embodiment, each one of the recesses 100 and 110 has a conical configuration. The recesses 100 and 110 could alternatively have a different configuration. The conical configuration is preferred because the circular base of the conical configuration minimizes stress concentration points.

The rod member 80 is symmetrical about a central axis 114 of the retainer assembly 70. That is, the portion of the rod member 80 which is disposed above the axis 114 (as viewed in FIG. 2) is a mirror image of the portion of the rod member which is disposed below the axis (as viewed in FIG. 2). In each pair of opposed recesses 100 and 110, the upper recess 100 is aligned with the lower recess 110 so that the central axis of each upper recess is coincident with the central axis of the corresponding lower recess.

Each upper recess 100 is defined by a conical surface 112 which tapers inwardly in a direction from a circular base 113 toward the axis 114. Each upper recess 100 has a width designated by the letter W in FIG. 2. The width W is equal to the diameter of the circular base 113 of the recess 100. Each lower recess 110 is defined by a conical surface 116 which tapers inwardly in a direction from a circular base toward the axis 114. Each lower recess 110 is similar to the upper recesses 100 with respect to its length and width.

The retainer assembly 70 also includes an outer member or sleeve member 120 which is molded as one piece with the lower wall 48 of the cover assembly 40, in a manner described below. The sleeve member 120 and the lower wall 48 are preferably made from DYM 100 thermoplastic polyester which is available from E. I. DuPont de Nemours & Co. This material has a melting point around 480° F.

The sleeve member 120 has a generally open elliptical cross-sectional configuration which is similar to that of the rod member 80. The sleeve member 120 is symmetrical about the axis 114. Thus, the portion of the sleeve member 120 which is disposed above the axis 114 (as viewed in FIG. 2) is a mirror image of the portion of the sleeve member which is disposed below the axis (as viewed in FIG. 2).

The sleeve member 120 includes an arcuate upper arm 122 which extends from the lower wall 48 of the cover assembly 40 in a direction generally toward the door 60. The upper arm 122 has a uniform wall thickness and an ellipsoidal outer side surface 124. The upper arm 122 has an ellipsoidal inner side surface 126 which includes an outer section 128 located closer to the door 60 and an inner section 130 located farther from the door 60. The inner side surface 126 of the upper arm 122 overlies the outer side surface 90 of the rod member 80. A planar end surface 132 on the upper arm 122 extends between the outer side surface 124 and the outer section 128 of the inner side surface 126. The end surface 132 on the upper arm 122 is in abutting engagement with the upper side surface 84 of the connector portion 82.

The upper arm 122 of the sleeve member 120 also includes an upper projection 140 which is disposed in the upper recess 100. The upper projection 140 has the same configuration as the upper recess 100. The base of the upper projection 140 is coincident with the base 113 of the upper recess 110 and has a circular configuration. The upper projection 140 has a conical outer side surface 142 and an apex 144 which is spaced apart from the axis 114 of the retainer assembly 70.

The upper projection 140 has a length designated by the letter L in FIG. 2. The length L is the distance between the apex 144 of the upper projection 140 and the base 113 of the upper recess 110, as measured in a straight line along the side surface 142 of the upper projection. The upper projection 140 has a width equal to the width W of the upper recess 100. The length L of the upper projection 140 is greater than, the width W of the upper recess 100. Thus, the length L of the upper projection 140 is greater than the width W of the upper projection.

The sleeve member 120 also includes an arcuate lower arm 150 which is a mirror image of the upper arm 122. The lower arm 150 extends from the lower wall 48 of the cover assembly 40 in a direction generally toward the door 60. The lower arm 150 and the upper arm 122 together define a chamber 152 in the sleeve member 120. The rod member 80 is disposed in the chamber 152.

The lower arm 150 has a uniform wall thickness and an ellipsoidal outer side surface 154. The lower arm 150 also has an ellipsoidal inner side surface 156 including an outer section 158 located closer to the door 60 and an inner section 160 located farther from the door 60. The inner side surface 156 of the lower arm 150 overlies the outer side surface 90 of the rod member 80. A planar end surface 162 on the lower arm 150 extends between the outer side surface 154 and the outer section 158 of the inner side surface 156. The end surface 162 on the lower arm 150 is in abutting engagement with the lower side surface 86 of the connector portion 82.

The lower arm 150 of the sleeve member 120 of the retainer assembly 70 includes a lower projection 170 which is disposed in the lower recess 110. The lower projection 170 has a conical configuration which is identical to the configuration of the lower recess 110. The base of the lower projection 170 has a circular configuration. The lower projection 170 has a conical outer side surface 172 and an apex 174 which is spaced apart from the axis 114.

The lower projection 170 is identical in size and configuration to the upper projection 140. The lower projection 170 has a length equal to the length L of the upper projection 140 and a width at its base equal to the width W of the lower recess 110. The length of the lower projection 170 is greater than its width and correspondingly is greater than the width of the lower recess 110.

The sleeve member 120 is made by a comolding process in which the rod member 80 having the conical recesses 100 and 110 is placed into a die and the sleeve member is molded around the rod member. The liquid plastic material which is molded to form the sleeve member 120 flows into the recesses 100 and 110 in the rod member 80 to form the projections 140 and 170 in situ. The recesses 100 and 110 act as dies for forming the projections 140 and 170. The side surfaces 112 and 116 of the recesses 100 and 110 define the boundaries of the projections 140 and 170. The rod member 80 is cooled in a known manner during the comolding process and thus does not melt even though the melting point of the material of the rod member is lower than the melting point of the material of the sleeve member 120.

The rod member 80 and the sleeve member 120 are thus mechanically interlocked in the process of forming the sleeve member including the projections 140 and 170. The materials from which the rod member 80 and the sleeve member 120 are made are selected so that the rod member and the sleeve member do not adhere or bond to each other.

Figure 5:
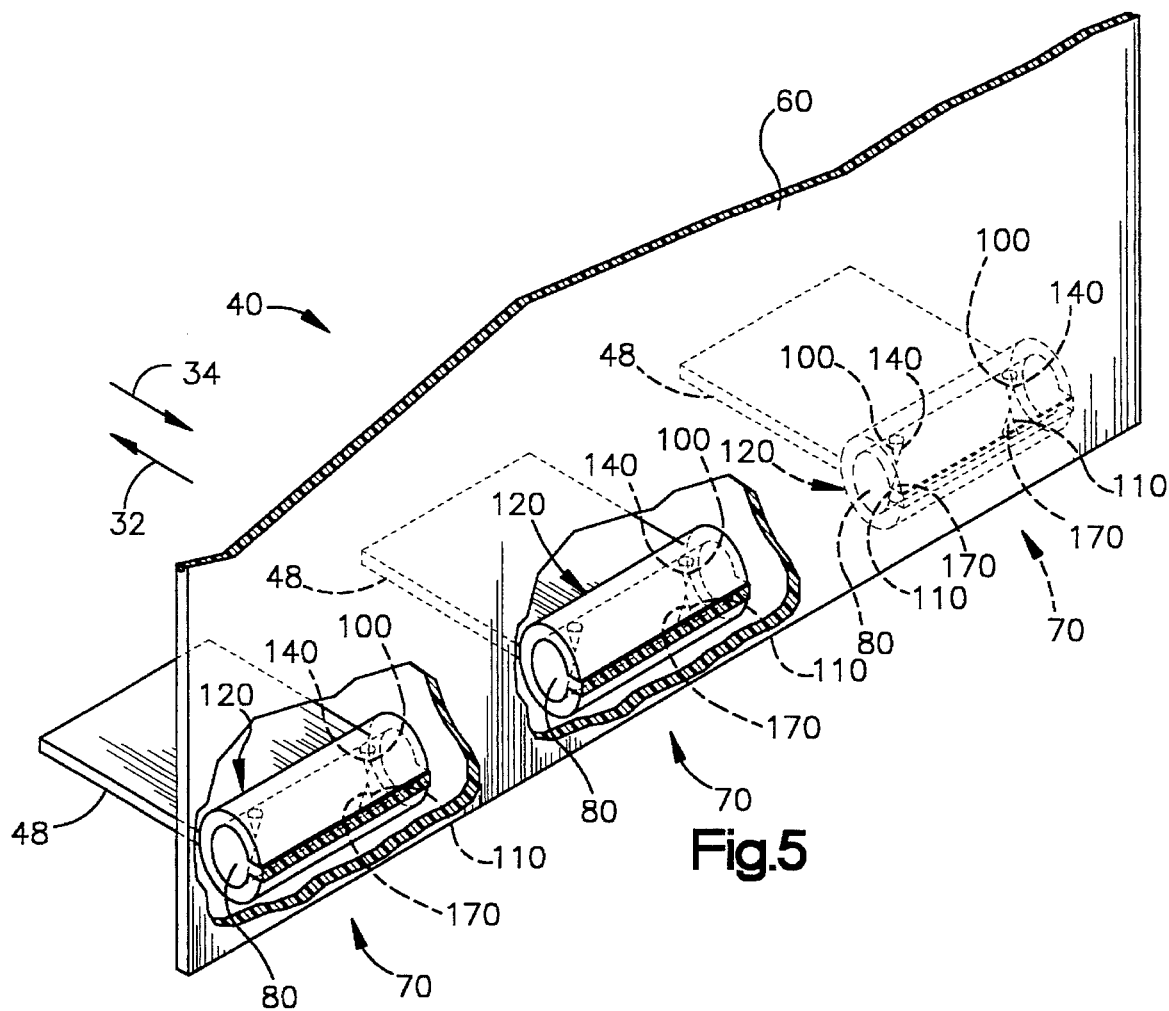
FIG. 5 is a perspective view partially in section of a portion of the door assembly of FIG. 1.

In the preferred embodiment of the invention as seen in FIG. 5, the cover assembly 40 includes three retainer assemblies 70, each about one inch to one-and-one-half inches long. Each retainer assembly 70 includes two opposed pairs of recesses 100 and 110 and projections 140 and 170. Alternatively, a cover assembly constructed in accordance with the present invention might include a single retainer assembly which extends the entire width (generally from lower left to upper right as viewed in FIG. 5) of the door 60. The single retainer assembly might include pairs of opposed conical recesses and projections, which pairs would be spaced apart along the entire extent of the retainer assembly, preferably about one pair every one inch to one-and-one-half inches.

The door 60 is illustrated in a closed position in FIG. 2 and in solid lines in FIG. 1. When the door 60 is in the closed position, the retainer assembly 70 is in an engaged condition as illustrated in FIG. 2 and in solid lines in FIG. 1. When the retainer assembly 70 is in the engaged condition, the upper projection 140 is disposed in and interlocked with the upper recess 100. The lower projection 170 is disposed in and interlocked with the lower recess 110. The interlocking engagement of the projections 140 and 170 with the recesses 100 and 110 blocks movement of the retainer assembly 70 from the engaged condition to the disengaged condition. The retainer assembly 70, because it is in the engaged condition, resists movement of the door 60 from the closed position to the open position.

In the event of vehicle deceleration exceeding a predetermined deceleration, the inflator 30 is actuated in a known manner to direct inflation fluid into the air bag 22. The air bag 22 unfolds and inflates in the rearward direction 34 toward the vehicle occupant. The inflating air bag 22 contacts the door 60.

When the amount of force exerted by the inflating air bag 22 exceeds a predetermined amount, the rod member 80 is pulled out of the chamber 152 in the sleeve member 120. The retainer assembly 70 moves from the engaged condition shown in FIG. 2 (and in solid lines in FIG. 1) to a disengaged condition such as shown in FIG. 3 (and in phantom in FIG. 1). During the disengagement process, the sleeve member 120 deforms as shown schematically in FIG. 3. The upper and lower arms 122 and 150 of the sleeve member 120 are deflected away from each other. The upper projection 140 moves out of the upper recess 100. The lower projection 170 moves out of the lower recess 110.

The door 60 pivots outwardly and upwardly about the hinge portion 46 from the closed position shown in solid lines in FIG. 1 to the open position shown in phantom in FIG. 1. The door 60 continues to pivot outwardly and upwardly until the air bag 22 inflates completely to restrain the vehicle occupant. After the rod member 80 is pulled out of the chamber 152 in the sleeve member 120, the resilience of the material of the sleeve member causes the upper and lower arms 122 and 150 of the sleeve member to return to their original positions. In these positions, the central axis of the upper projection 140 is coincident with the central axis of the lower projection 170. The sleeve member 120 is in the condition shown in FIG. 2 but disengaged or separated from the rod member 80.

In order to move (or return) the door 60 from the open position to the closed position, the retainer assembly 70 must be moved (or returned) from the disengaged condition to the engaged condition. FIG. 4 illustrates schematically the parts of the retainer assembly 70 during attempted movement of the retainer assembly from the disengaged condition to the engaged condition. In FIG. 4, the door 60 is shown as moving in the forward direction 32, that is, to the left as viewed in FIG. 4. The lower wall portion 48 of the cover assembly 40 and the sleeve member 120 are fixed in position.

As the door 60 moves in the direction 32 from the open position toward the closed position, the rod member 80 engages the sleeve member 120. The close spacing between the end surface 132 of the upper arm 122 of the sleeve member 120 and the end surface 162 of the lower arm 150 of the sleeve member hinders movement of the rod member 80 into the chamber 152 in the sleeve member. This condition (not shown) of the parts of the retainer assembly 70 is typically sufficient to prevent returning the retainer assembly to the engaged condition.

However, if the upper and lower arms 122 and 150 of the sleeve member 120 are manually forced apart to a position as seen in FIG. 4, the rod member 80 can be moved at least partially into the chamber 152 in the sleeve member as seen in FIG. 4. Should this happen, the rod member 80 engages the projections 140 and 170 and deflects the projections away from the recesses 100 and 110 as shown in FIG. 4.

Specifically, the outer side surface 90 (FIG. 2) of the rod member 80 engages the outer side surface 142 of the upper projection 140 and the outer side surface 172 of the lower projection 170. The force of the moving rod member 80 is transmitted to the upper and lower projections 140 and 170 and causes the projections to be deflected to the position shown in FIG. 4. The upper projection 140 is forced away from the recess 100 and is pressed against the inner section 130 (FIG. 2) of the inner side surface 126 of the upper arm 122 of the sleeve member 120. The lower projection 170 is forced away from the recess 110 and is pressed against the inner section 160 of the inner side surface 156 of the lower arm 150 of the sleeve member 120.

The upper projection 140 as thus positioned resists movement of the upper recess 100 into alignment with the base of the upper projection. Even should the base 113 of the upper recess 100 be aligned with, that is, overlie, the base of the upper projection 140, the upper projection extends substantially transverse to the upper recess. Because the length L of the upper projection 140 is greater than the width W of the upper recess 100, and because the upper projection is disposed transverse to or almost perpendicular to the upper recess, the apex 144 of the upper projection can not enter into the base 113 of the upper recess from the position shown in FIG. 4.

Similarly, the lower projection 170 as thus positioned resists movement of the base of the lower recess 110 into alignment with the base of the lower projection. Even should the base of the lower recess 110 be aligned with, that is, overlie, the base of the lower projection 170, the lower projection could not move into the lower recess and return to the interlocked position shown in FIG. 2. This is because the length of the lower projection 170 is greater than the width of the lower recess 110, and so the lower projection can not fit into the lower recess from the position shown in FIG. 4.

It is conceivable that the sleeve member 120 could manually be forced into the position shown in FIG. 3 in an attempt to spread apart the arms 122 and 150 far enough to enable the projections 140 and 170 to re-enter the recesses 100 and 110. Such a condition could not, however, be obtained without extraordinary manipulation of the parts of the sleeve member 120 and the rod member 80, which is extremely unlikely and difficult in the close confines behind the door 60 of the cover assembly 40. Therefore, because the upper projection 140 can not move into the upper recess 100 and the lower projection 170 can not move into the lower recess 110 as shown in FIG. 4, the sleeve member 120 can not be interlocked with the rod member 80. Thus, the retainer assembly 70 can not be returned to the engaged condition. Because the retainer assembly 70 can not be returned to the engaged condition, the door 60 can not be returned to the closed position after once having been opened. As a result, the air bag module 10 can not be properly closed up after being opened for service unless a new cover assembly 40 is provided. Improper servicing or opening of the air bag module 10 would be evident because the door 60 would not be closed and the retainer assembly 70 would not be in the engaged condition.

FIG. 6 illustrates portions of an air bag module 200 which is constructed in accordance with a second embodiment of the present invention. The air bag module 200 includes an air bag 202 which is inflatable through a deployment opening 204 in a vehicle instrument panel 206. The instrument panel 206 includes a metal backing plate 208, a layer of polyurethane foam 210, and a vinyl skin 212.

The opening 204 in the instrument panel 206 is covered by a pivotally movable deployment door 220. The deployment door 220 includes a metal door panel 222, a layer of polyurethane foam 224, and a vinyl skin 226. The air bag module 200 also includes a metal housing 228 and an inflator 230. The housing 228 is fixed to the vehicle instrument panel 206 and supports the inflator 230 and the air bag 202 in a known manner. The deployment door 220 is movable from a closed position illustrated in FIG. 6 to an open position (not shown), by the force of the inflating air bag 202, to enable the air bag to deploy into a position to restrain an occupant of the vehicle in which the air bag module 200 is mounted.

The air bag module 200 includes a retainer assembly 240 for blocking movement of the deployment door 220 from the closed position to the open position. The retainer assembly 240 is similar in structure and operation to the retainer assembly 70 (FIGS. 1–5) and includes a rod member 242 which is fixed to the door panel 222 by one or more rivets 244. The retainer assembly 240 includes a sleeve member 246 which is fixed to the housing 228 by a one or more rivets 248. Projections 250 on the sleeve member 246 interlock with recesses 252 on the rod member 242. The sleeve member 246 is molded in situ around the rod member 242 by the comolding process described above.

The retainer assembly 240 is shown in an engaged condition in FIG. 6. In the event of a vehicle collision requiring inflation of the air bag 202, the inflator 230 is actuated in a known manner and directs inflation fluid into the air bag. The air bag 202 inflates from the stored and folded condition to an inflated condition to restrain the vehicle occupant.

The force of the inflating air bag 202 is transmitted into the door panel 222. Movement of the deployment door 220 from the closed position illustrated in FIG. 6 toward the open position is resisted by the retainer assembly 240. When the amount of force exerted on the door panel 222 by the inflating air bag 202 exceeds a predetermined amount, the retainer assembly 240 moves from the engaged condition to a disengaged condition, in the manner illustrated in FIG. 3 with reference to the first embodiment of the invention. The deployment door 220 moves in the direction 260 from the closed position shown in FIG. 6 to an open position (not shown). The air bag 202 inflates and deploys through the opening 204 in the vehicle instrument panel 206 to restrain the vehicle occupant. The retainer assembly 240 stays in the disengaged condition and therefore the deployment door 220 can not be returned to the closed condition.

In the preferred embodiments of the invention, each upper projection is disposed opposite a lower projection. It should be understood that the upper and lower projections could be staggered or alternated—that is, a lower projection could be disposed intermediate two upper projections (as viewed from the right in FIG. 5, for example). Also, projections such as the projections 140 and 170 could be located on only the top or the bottom (as viewed in FIG. 2) of a retainer assembly. Further, in the illustrated embodiments the rod member which includes the recesses is connected for movement with the movable door. This orientation could be reversed, and the sleeve member having the projections could be connected for movement with the movable portion of the cover assembly. The projections and recesses could also be located in a side-to-side relationship rather than above and below each other.

From the above description of the invention, those skilled in the art will perceive further improvements, changes and modifications in the invention. For example, the door 60 or the cover assembly 40 can be mounted on the instrument panel 20 rather than on the housing 12. The housing 12 need not be a separate element from the instrument panel 20; instead, the housing could be defined by other structures in the instrument panel. The inflator 30 need not be located in the housing but may be remote from the housing that holds the air bag 22. Such improvements, changes and modifications within the skill of the art are intended to be covered by the appended claims.

Having described the invention, I claim:

1. A vehicle occupant safety apparatus comprising:

a housing having a deployment opening;

an inflatable vehicle occupant restraint in said housing for, when inflated, restraining the vehicle occupant;

an inflator for, when actuated, inflating said inflatable vehicle occupant restraint through said deployment opening, said inflator being supported by said housing;

a deployment door movable between a closed position covering said deployment opening and an open position uncovering said deployment opening; and retainer means for holding said deployment door in the closed position, said retainer means being movable between (a) an engaged condition blocking movement of said deployment door from the closed position to the open position and (b) a disengaged condition when said deployment door moves from the closed position to the open position;

said retainer means including means for preventing movement of said retainer means from the disengaged condition to the engaged condition upon movement of said deployment door from the open position to the closed position;

wherein said retainer means comprises an outer member defining a chamber and an inner member received in said chamber, said inner member including surface means for defining a plurality of recesses, said outer member including a plurality of projections, each one of said projections being received in a corresponding one of said recesses to interlock said inner member with said outer member when said retainer means is in the engaged condition.

2. A vehicle occupant safety apparatus as set forth in claim 1 wherein each one of said projections includes a base, an apex, and a side surface which extends from said base to said apex, said base having a width which is less than the length of said side surface.

3. A vehicle occupant safety apparatus as set forth in claim 1 wherein each one of said projections includes a portion which is pressed into engagement with a surface portion of said inner member upon movement of said retainer means from the disengaged condition toward the engaged condition to block movement of said projections into said recesses.

4. A vehicle occupant safety apparatus as set forth in claim 1 wherein each one of said projections is made from a moldable plastic material formed in situ in a corresponding one of said recesses, each one of said recesses comprising surface means for defining a corresponding one of said projections during the formation of said one corresponding projection.

5. A vehicle occupant safety apparatus comprising:

a housing having a deployment opening;

an inflatable vehicle occupant restraint in said housing for, when inflated, restraining the vehicle occupant;

an inflator for, when actuated, inflating said inflatable vehicle occupant restraint through said deployment opening, said inflator being supported by said housing;

a deployment door movable between a closed position covering said deployment opening and an open position uncovering said deployment opening; and retainer means for holding said deployment door in the closed position, said retainer means being movable between (a) an engaged condition blocking movement of said deployment door from the closed position to the open position and (b) a disengaged condition when said deployment door moves from the closed position to the open position;

said retainer means including means for preventing movement of said retainer means from the disengaged condition to the engaged condition upon movement of said deployment door from the open position to the closed position;

wherein said means for preventing movement of said retainer means from the disengaged condition toward the engaged condition upon movement of said deployment door from the open position to the closed position comprises a recess and a projection which is disposed in said recess prior to movement of said deployment door from the closed position to the open position, said retainer means including surface means for deflecting said projection to prevent movement of said projection into said recess upon movement of said deployment door from the open position toward the closed position.

6. A vehicle occupant safety apparatus comprising:

a housing having a deployment opening;

an inflatable vehicle occupant restraint in said housing for, when inflated, restraining the vehicle occupant;

an inflator for, when actuated, inflating said inflatable vehicle occupant restraint through said deployment opening, said inflator being supported by said housing;

a deployment door movable between a closed position covering said deployment opening and an open position uncovering said deployment opening; and retainer means for holding said deployment door in the closed position, said retainer means being movable between (a) an engaged condition blocking movement of said deployment door from the closed position to the open position and (b) a disengaged condition when said deployment door moves from the closed position to the open position;

said retainer means including means for preventing movement of said retainer means from the disengaged condition to the engaged condition upon movement of said deployment door from the open position to the closed position;

wherein said retainer means comprises an inner member, an outer member, a projection on a first one of said inner member and said outer member, and a recess on a second one of said inner member and said outer member, said projection being disposed in said recess, said projection including a base, an apex, and a side surface which extends from said base to said apex, said base having a width which is less than the length of said side surface.

7. A vehicle occupant safety apparatus as set forth in claim 6 wherein said projection has a conical configuration, said base of said projection having a circular configuration, said recess having a conical configuration which is substantially the same as the conical configuration of said projection.

8. A vehicle occupant safety apparatus as set forth in claim 6 wherein said projection is made from a moldable plastic material formed in situ in said recess, said recess comprising surface means for defining said projection during the formation of said projection.

9. A vehicle occupant safety apparatus comprising:

a housing having a deployment opening;

an inflatable vehicle occupant restraint in said housing for, when inflated, restraining the vehicle occupant;

an inflator in said housing for, when actuated, inflating said inflatable vehicle occupant restraint through said deployment opening;

a deployment door movable between a closed position covering said deployment opening and an open position uncovering said deployment opening; and retainer means for holding said deployment door in the closed position, said retainer means being movable between an engaged condition blocking movement of said deployment door from the closed position to the open position and a disengaged condition allowing movement of said deployment door from the closed position to the open position;

said retainer means including a recess and a projection which is disposed in said recess prior to movement of said deployment door from the closed position to the open position;

said retainer means including surface means for deflecting said projection to prevent movement of said projection into said recess upon movement of said deployment door from the open position toward the closed position.

10. A vehicle occupant safety apparatus as set forth in claim 9 wherein said recess is formed in a first member and has a conical cross-sectional configuration, said projection being formed in a second member and having a conical cross-sectional configuration which is substantially the same as the cross-sectional configuration of said recess, said surface means for deflecting said projection comprising portions of said first member extending around said recess.

11. A vehicle occupant safety apparatus as set forth in claim 9 wherein said projection is made from a moldable plastic material formed in situ in said recess, said recess comprising surface means for defining said projection during the formation of said projection.

12. A vehicle occupant safety apparatus as set forth in claim 9 wherein said retainer means includes a second recess and a second projection disposed in said second recess prior to movement of said deployment door from the closed position to the open position, said second recess and projection being disposed adjacent to said first recess and said first projection on a side of an axis of said retainer means which is opposite from said first recess and said first projection.

13. A vehicle occupant safety apparatus as set forth in claim 9 wherein said retainer means comprises an outer member defining a chamber and an inner member received in said chamber, said inner member including surface means for defining said recess, said outer member including said projection, said projection being received in said recess to interlock said inner member with said outer member.

14. A vehicle occupant safety apparatus as set forth in claim 9 wherein said projection has a base and an apex and a side surface extending between said base and said apex, said base of said projection having a width which is less than the length of said side surface.

15. A method of making a cover assembly for covering a deployment opening in a housing for an inflatable vehicle occupant restraint, the cover assembly including first and second portions, one of the first and second portions being movable between a closed position covering the deployment opening and an open position uncovering the deployment opening, the first and second portions of the cover assembly having respective first and second interlocking members which are movable relative to each other between an engaged condition blocking movement of the one portion of the cover assembly from the closed position to the open position and a disengaged condition allowing movement of the one portion of the cover assembly from the closed position to the open position, said method comprising the steps of:

selecting a first moldable material for molding of the first interlocking member;

molding the first interlocking member from the first material;

selecting a second moldable material for molding of the second interlocking member which second material does not adhere to the first material when molded against the first material; and molding the second interlocking member in the engaged condition with the first interlocking member.

16. A method as set forth in claim 15 wherein said step of molding the first interlocking member from the first material includes the step of molding at least one recess in the first member and wherein said step of molding the second interlocking member includes the step of molding a projection of said second interlocking member in situ in said at least one recess.

17. A method as set forth in claim 16 wherein said step of molding a recess includes the step of molding a recess having a length which is greater than its width.

18. A method as set forth in claim 15 further comprising the steps of:

providing a housing having a deployment opening;

providing an inflatable vehicle occupant restraint for, when inflated, restraining a vehicle occupant;

providing an inflator in the housing for, when actuated, inflating the inflatable vehicle occupant restraint through the deployment opening; and covering the deployment opening with the cover assembly.

19. A method comprising the steps of:

making a cover assembly for covering a deployment opening in a housing for an inflatable vehicle occupant restraint, the cover assembly including first and second portions, one of the first and second portions being movable between a closed position covering the deployment opening and an open position uncovering the deployment opening, the first and second portions of the cover assembly having respective first and second interlocking members which are movable relative to each other between an engaged condition blocking movement of the one portion of the cover assembly from the closed position to the open position and a disengaged condition allowing movement of the one portion of the cover assembly from the closed position to the open position;

said step of making the cover assembly including the steps of selecting a first moldable material for molding of the first interlocking member, molding the first interlocking member from the first material, selecting a second moldable material for molding of the second interlocking member which second material does not adhere to the first material when molded against the first material, and molding the second interlocking member in the engage condition with the first interlocking member;

moving the movable portion of the cover assembly from the closed position to the open position, said step of moving the movable portion of the cover assembly from the closed position to the open position including the step of moving the interlocking members from the engaged condition to the disengaged condition; and maintaining the interlocking members in the disengaged condition upon movement of the movable portion of the cover assembly from the open position to the closed position.

* * * * *